(12) United States Patent
Cho et al.

(10) Patent No.: US 10,866,650 B2
(45) Date of Patent: Dec. 15, 2020

(54) METHOD AND DEVICE FOR RECOGNIZING POINTING LOCATION BY USING RADAR

(71) Applicant: WRT LAB CO., LTD., Seoul (KR)

(72) Inventors: Sung Ho Cho, Seoul (KR); Dae Hyeon Yim, Seoul (KR)

(73) Assignee: WRT LAB CO., LTD., Seoul (KR)

( * ) Notice: Subject to any disclaimer, the term of this patent is extended or adjusted under 35 U.S.C. 154(b) by 0 days.

(21) Appl. No.: 16/484,347

(22) PCT Filed: Feb. 13, 2018

(86) PCT No.: PCT/KR2018/001887
§ 371 (c)(1),
(2) Date: Aug. 7, 2019

(87) PCT Pub. No.: WO2018/151504
PCT Pub. Date: Aug. 23, 2018

(65) Prior Publication Data
US 2020/0033949 A1    Jan. 30, 2020

(30) Foreign Application Priority Data
Feb. 15, 2017    (KR) .................. 10-2017-0020466

(51) Int. Cl.
*G06F 3/01*    (2006.01)
*G01S 13/06*    (2006.01)

(52) U.S. Cl.
CPC .............. *G06F 3/017* (2013.01); *G01S 13/06* (2013.01)

(58) Field of Classification Search
None
See application file for complete search history.

(56) References Cited

U.S. PATENT DOCUMENTS

2011/0181509 A1    7/2011    Rautiainen et al.
2012/0268372 A1*  10/2012    Park .................. G06F 3/0304
                                                345/158
(Continued)

FOREIGN PATENT DOCUMENTS

KP    10-2017-0012422 A    2/2017
KR    10-2008-0102516 A    11/2008
KR    10-2016-0128318 A    11/2016

OTHER PUBLICATIONS

International Search Report issued in PCT/KR2018/001887, dated May 29, 2018.

*Primary Examiner* — Duane N Taylor, Jr.
(74) *Attorney, Agent, or Firm* — Locke Lord LLP; Scott D. Wofsy

(57) ABSTRACT

Provided is a method and device for recognizing a pointing location by using a radar. A device according to an embodiment of the present disclosure comprises: a weight value space generation unit for generating a weight value space comprising a plurality of unit spaces in a space in front of the screen, and setting weight values in proportion to intensity of clutter-removed reception signals of the plurality of radars to the unit spaces; a hand area detection unit for adding up the set weight values for each of the unit spaces of the weight value space; an effective radar selection unit for selecting, as an effective radar, a radar having a shortest distance to the detected hand area among the plurality of radars; and a finger position determination unit for detecting a first location (first path) exceeding a predetermined threshold value.

14 Claims, 9 Drawing Sheets

(56) References Cited

U.S. PATENT DOCUMENTS

2012/0280900 A1   11/2012  Wang et al.
2015/0153905 A1*  6/2015  Wang .................... G06F 1/1607
                                                            345/175

* cited by examiner

[FIG. 1]
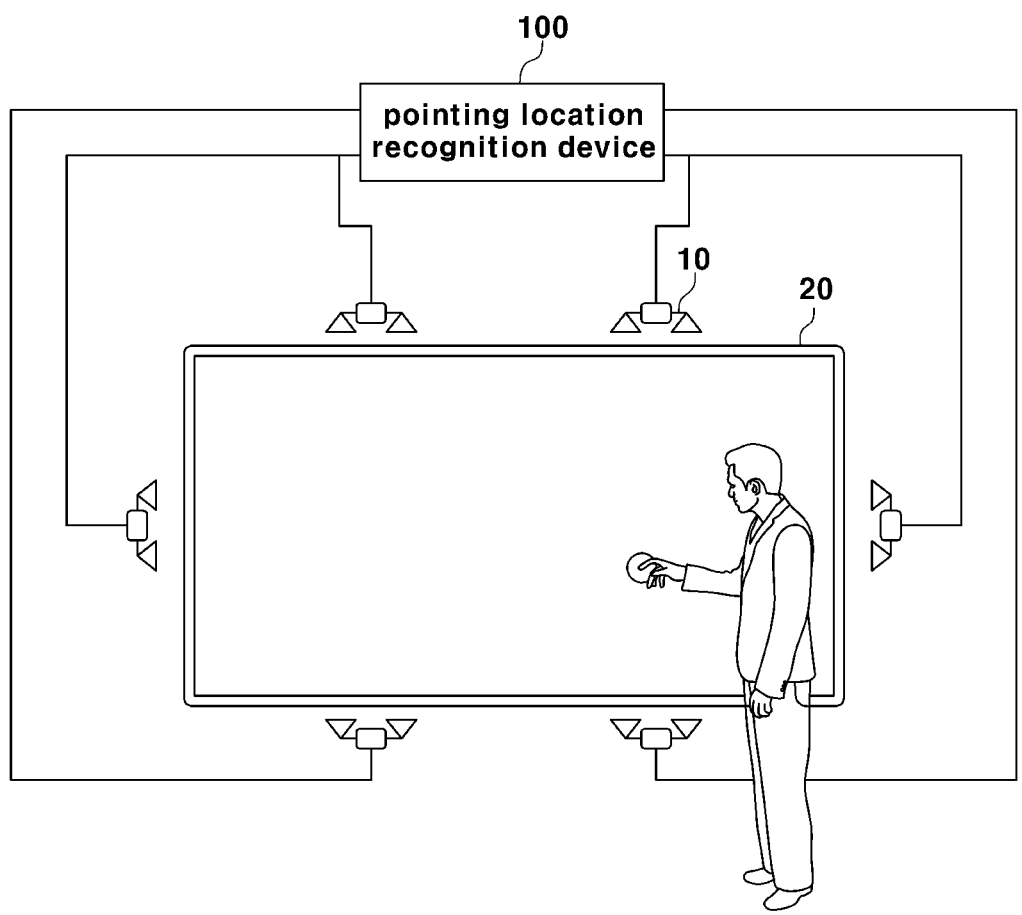

[FIG. 2]
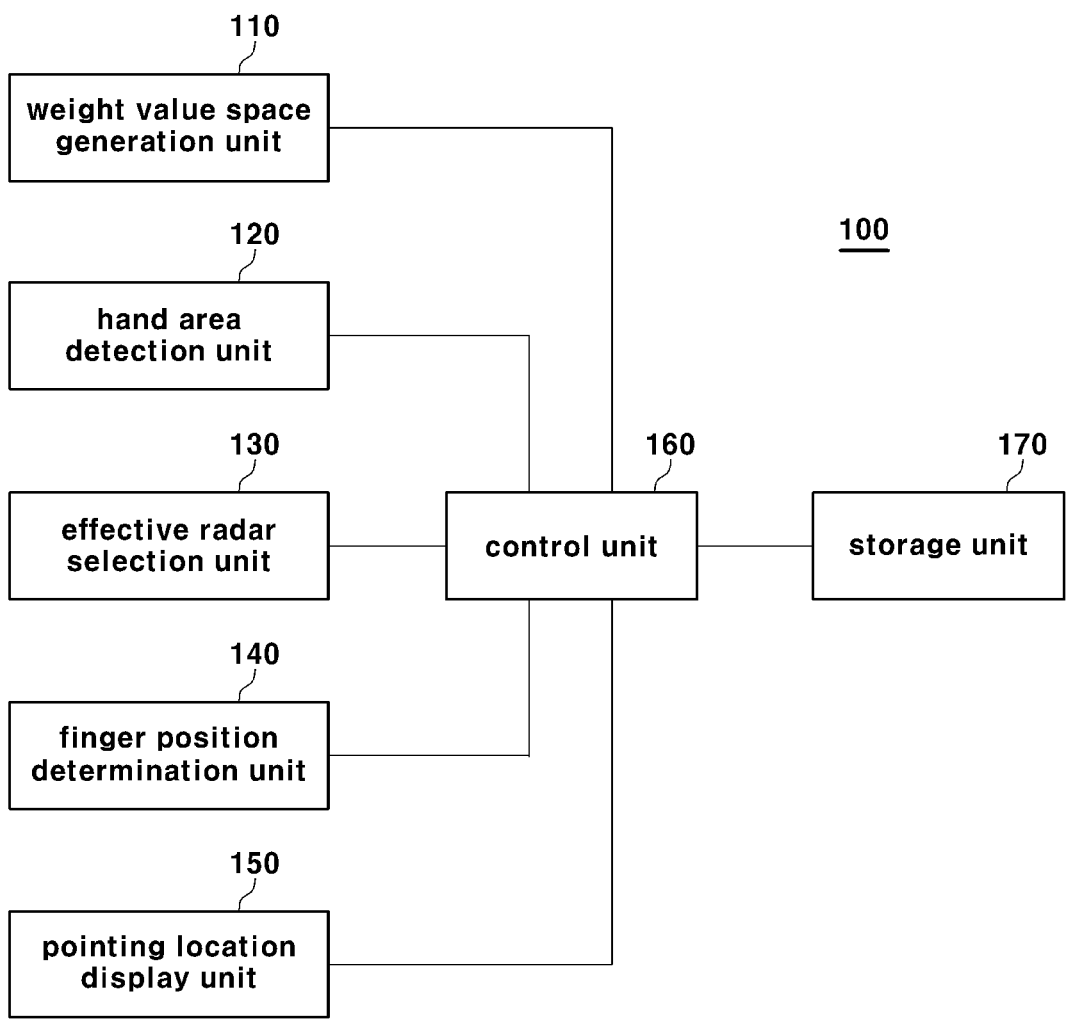

[FIG. 3]
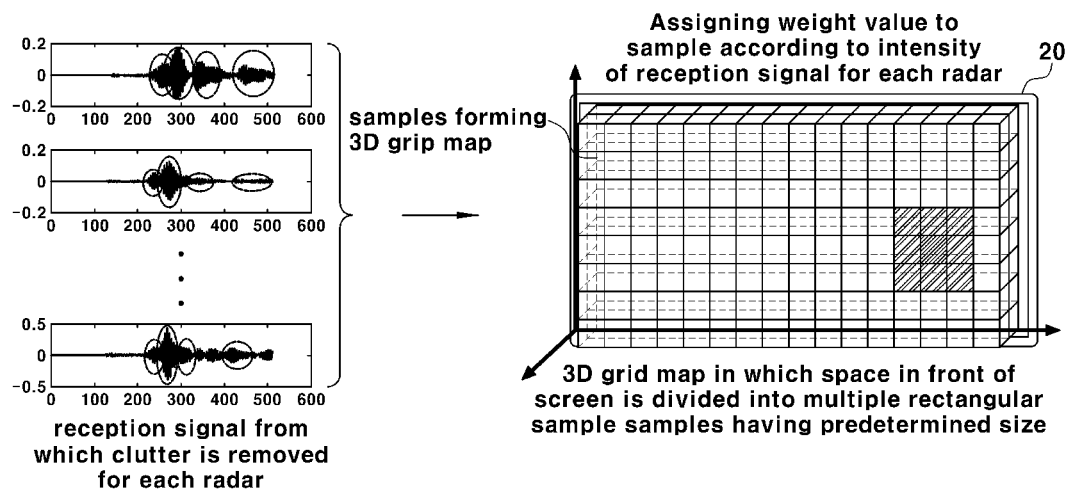

[FIG. 4]
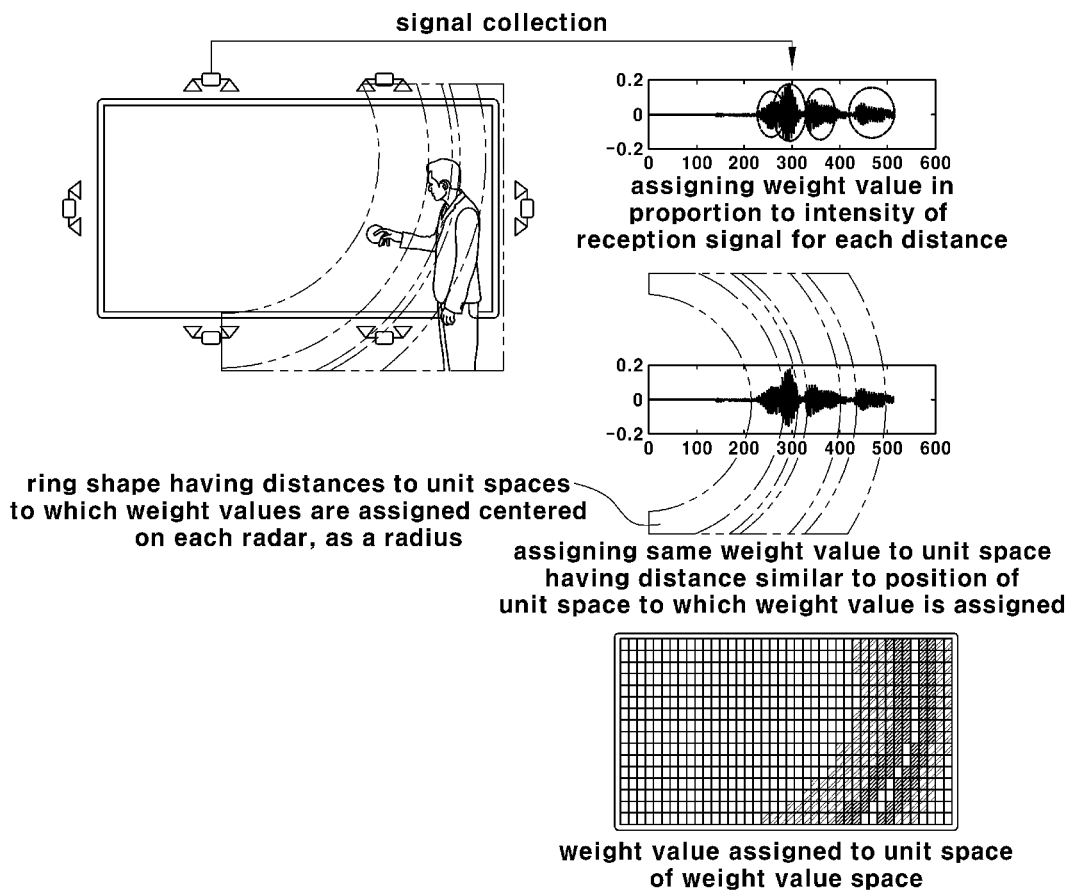

[FIG. 5]
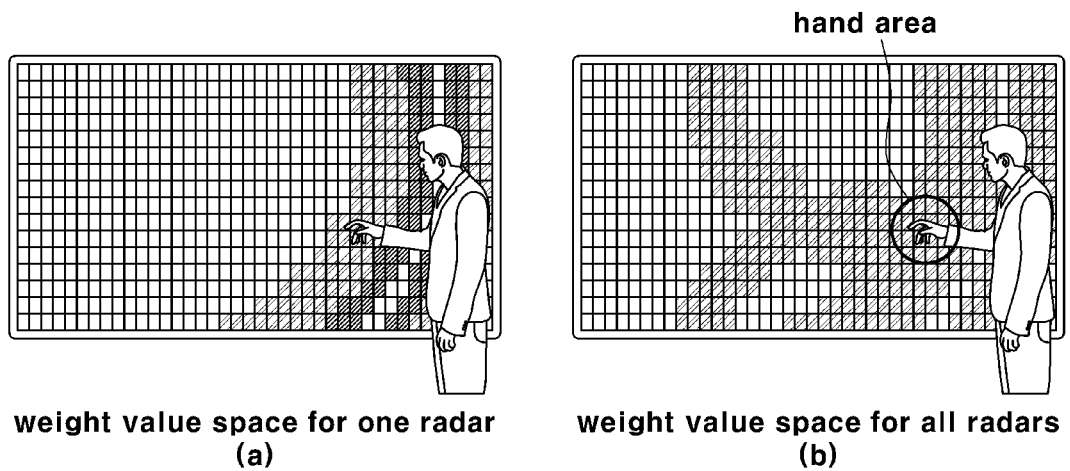
weight value space for one radar
(a)
weight value space for all radars
(b)
[FIG. 6]
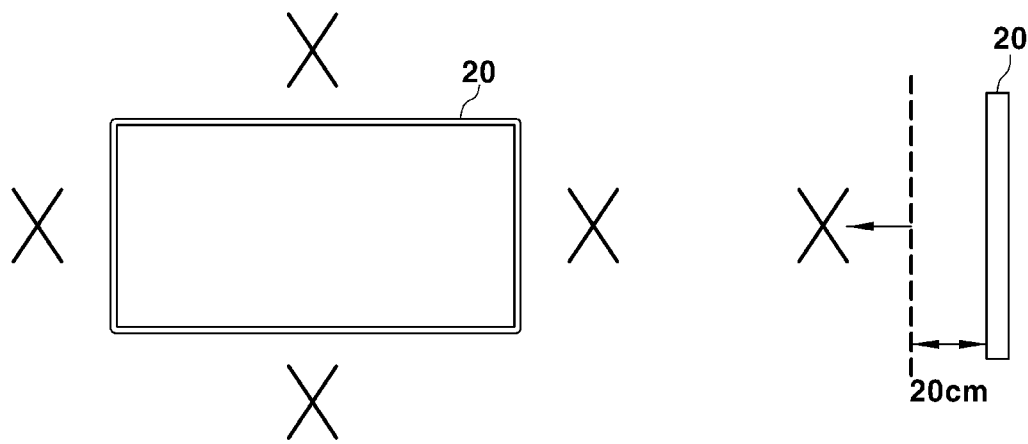
X: region in which pointing location is not determined

[FIG. 7]
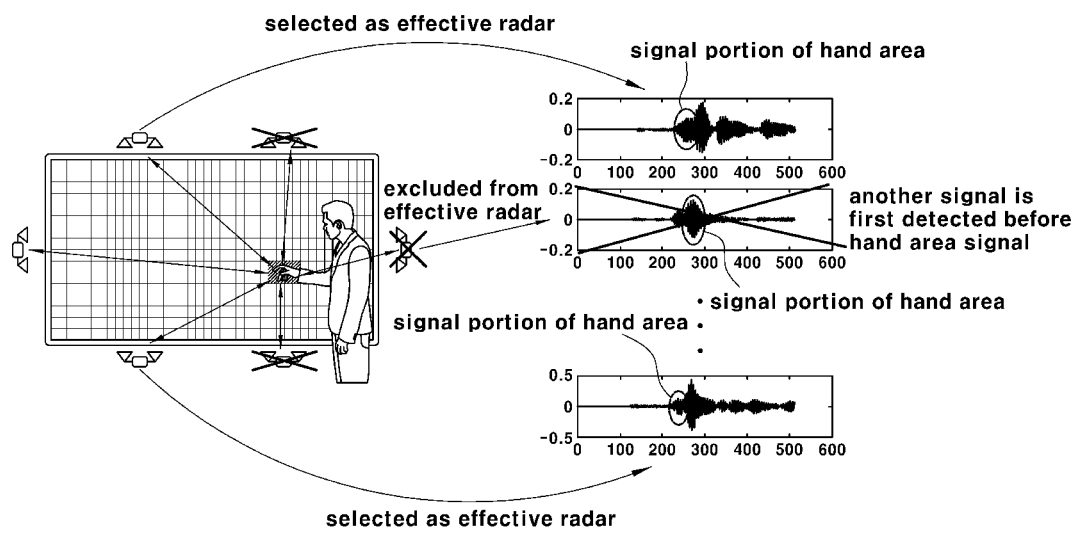

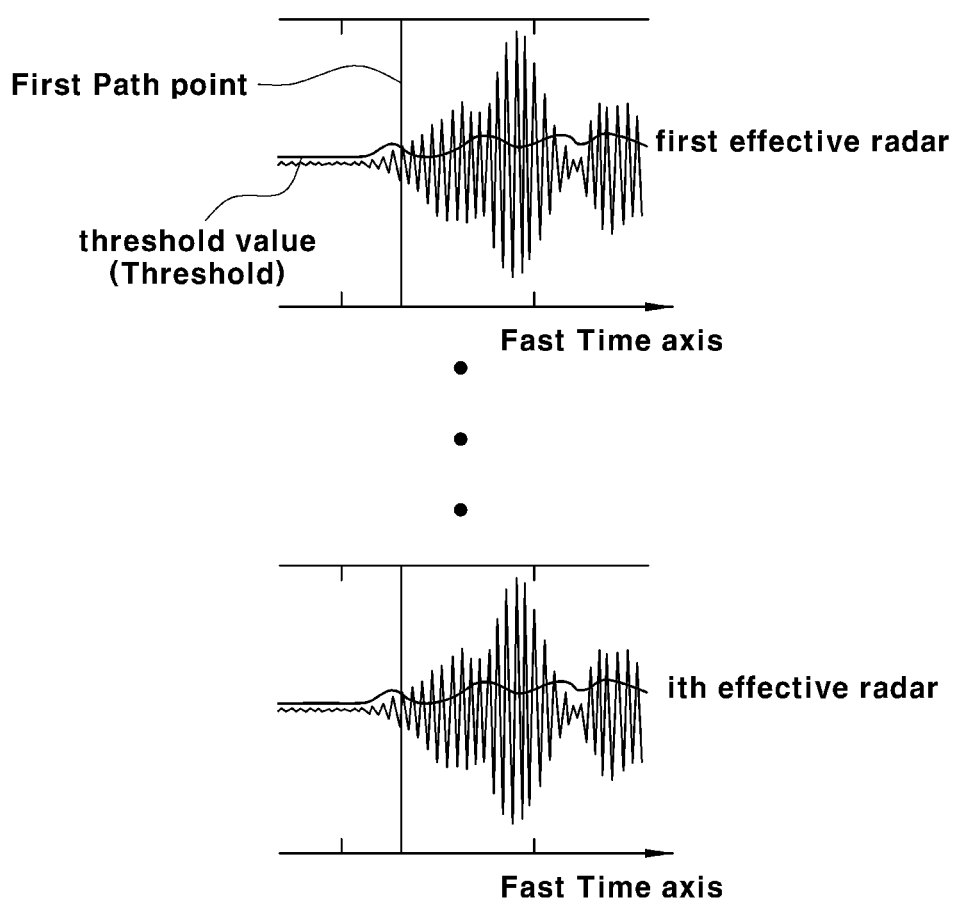
[FIG. 8]

[FIG. 9]
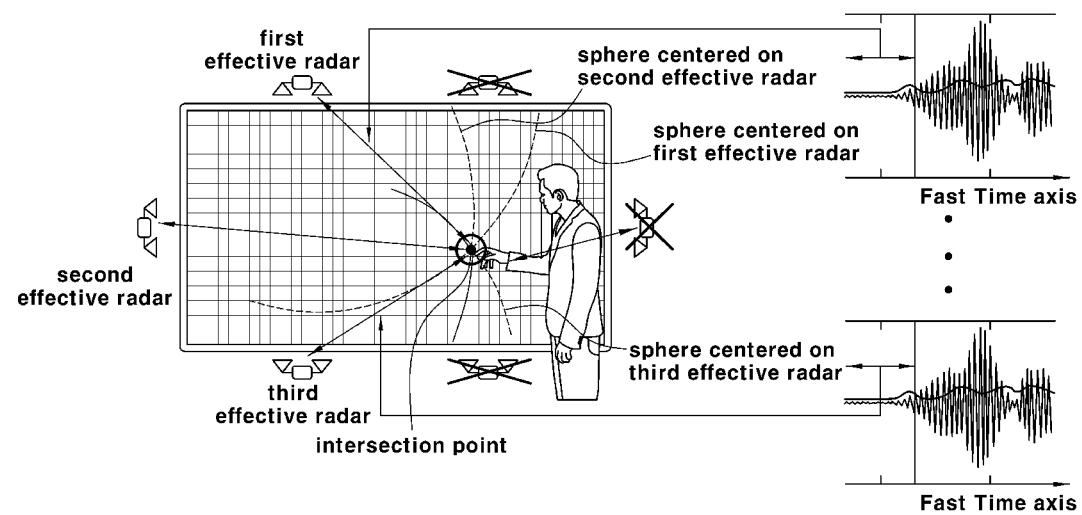

[FIG. 10]
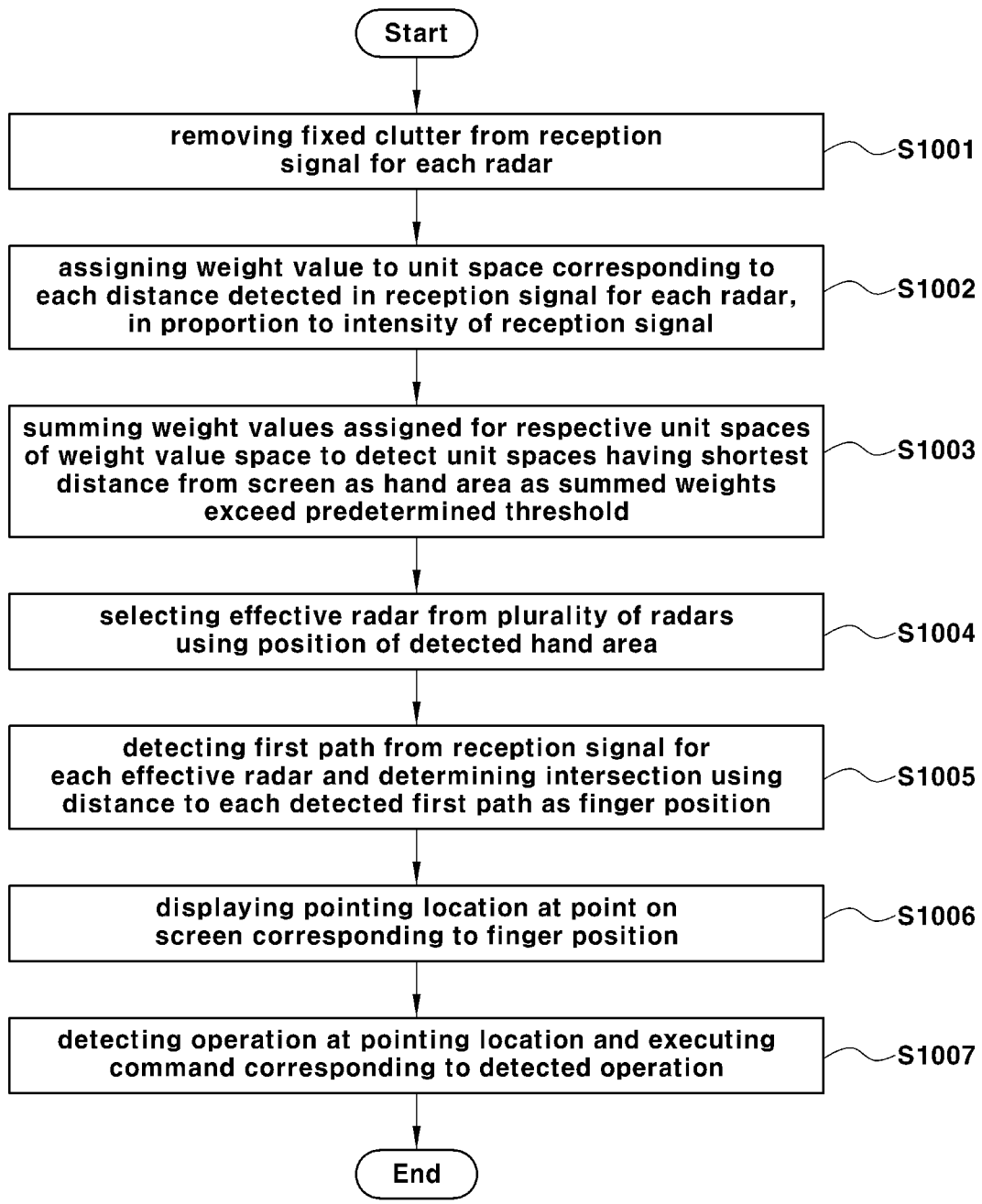

METHOD AND DEVICE FOR RECOGNIZING POINTING LOCATION BY USING RADAR

CROSS REFERENCE TO RELATED APPLICATIONS

This application is a U.S. National Phase Application filed under 35 U.S.C. § 371, based on International PCT Patent Application No. PCT/KR2018/001887, filed Feb. 13, 2018 which application claims priority to Korean Patent Application No. 10-2017-0020466 filed on Feb. 15, 2017. The entire contents of these applications is incorporated herein by reference in their entirety.

TECHNICAL FIELD

The present disclosure relates to a method and device for recognizing a pointing location by using a radar and, more particularly, to a technique for recognizing a pointing location pointed by a user's hand in a display area such as a screen or the like.

BACKGROUND ART

Ultra Wide Band (UWB) is a radio technology in which a frequency band of 500 MHz or more is used, or a value defined by a fraction bandwidth, which is a bandwidth of a signal compared to a center frequency, is 25% or more.

That is, the UWB is a radio technology using a wide-band frequency and has various advantages such as high distance resolution, transmittance, strong immunity to narrow-band noise, and coexistence with other devices sharing frequency.

Impulse-Radio Ultra Wide Band (IR-UWB) radar (hereinafter, referred to "UWB radar") technology is a radar technology combining such UWB technology with a radar, in order to recognize the surrounding situation by transmitting an impulse signal having wide-band characteristics at a frequency region for a very short duration and receiving signals returned from objects and people.

Such a UWB radar system is provided so that an impulse signal having a time width of several nanometers to several picoseconds is generated by a signal generator and is radiated at a wide angle or a angle of narrow-band through a transmission antenna, and then the radiated signal is reflected by various objects or people and is converted into a digital signal through a receiving antenna and an ADC.

Meanwhile, technologies for recognizing a pointing location of a user to provide various functions have been proposed.

As an example, a technique has been proposed in which a screen is photographed through a video camera provided in a projector and a portion having a specific shape for an image of the photographed screen is sensed through an image processing process, thereby recognizing a pointing location.

However, this technique has a problem that a high-cost camera and a complicated image processing block must be provided in the projector.

In addition to this method, there has been proposed a method of arranging elements capable of recognizing a laser pointer on a screen. However, there is a problem that a specific screen having a large volume and a high cost should be provided for each presentation place.

DISCLOSURE

Technical Problem

The present disclosure has been made to solve the above problems of the related art, and it is an object of the present disclosure to provide a method and device for recognizing a user's pointing location by using radar even when there is no physical contact with a separate tool or a screen by a user.

Technical Solution

In order to achieve the object, a device for recognizing a user's pointing location by using a plurality of radars arranged around a screen according to an embodiment of the present disclosure includes a weight value space generation unit generating a weight value space having a plurality of unit spaces in a space in front of the screen, and assigning a weight value to the unit space corresponding to each of distances detected in a reception signal for each of the plurality of radars, from which clutter is removed, in proportion to intensity of the reception signal; a hand area detection unit summing the weight values assigned for the respective unit spaces of the weight value space, and detecting, as a hand area, unit spaces having a shortest distance from the screen as the summed weight values exceeds a predetermined threshold value; an effective radar selection unit selecting, as an effective radar, a radar having a shortest distance to the detected hand area among the plurality of radars; and a finger position determination unit detecting a first point (first path) exceeding a predetermined threshold value in the reception signal for each of the selected effective radars, and determining, as a position of a user's finger, an intersection point using a distance to each of the detected first points (first paths).

In order to achieve the object, a method of recognizing a user's pointing location by using a plurality of radars arranged around a screen according to an embodiment of the present disclosure includes (a) generating a weight value space having a plurality of unit spaces in a space in front of the screen, and assigning a weight value to the unit space corresponding to each of distances detected in a reception signal for each of the plurality of radars, from which clutter is removed, in proportion to intensity of the reception signal; (b) summing the weight values assigned for the respective unit spaces of the weight value space, and detecting, as a hand area, unit spaces having a shortest distance from the screen as the summed weight values exceeds a predetermined threshold value; (c) selecting, as an effective radar, a radar having a shortest distance to the detected hand area among the plurality of radars; and (d) detecting a first point (first path) exceeding a predetermined threshold value in the reception signal for each of the selected effective radars, and determining, as a position of a user's finger, an intersection point using a distance to each of the detected first points (first paths).

Advantageous Effects

According to an embodiment of the present disclosure, it is possible to recognize a user's pointing location even when there is no physical contact with a separate tool or a screen by a user.

Also, since the user's pointing location can be recognized even in a non-contact manner, the present disclosure can be applied to a large screen.

It should be understood that the effects of the present disclosure are not limited to the above effects and include all effects that can be deduced from the detailed description of the present disclosure or the configuration of the disclosure described in the claims.

DESCRIPTION OF DRAWINGS

FIG. 1 is a diagram illustrating a configuration of a system for recognizing a pointing location using radar according to an embodiment of the present disclosure.

FIG. 2 is a block diagram illustrating a configuration of a pointing location recognition device according to an embodiment of the present disclosure.

FIG. 3 is a diagram illustrating a 3D space grid map according to an embodiment of the present disclosure.

FIG. 4 is a diagram illustrating a weight value space according to an embodiment of the present disclosure.

FIG. 5 is a diagram illustrating a hand area detection method according to an embodiment of the present disclosure.

FIG. 6 is a diagram illustrating a sensing region according to an embodiment of the present disclosure.

FIG. 7 is a diagram illustrating an effective radar selecting method according to an embodiment of the present disclosure.

FIG. 8 is a diagram illustrating a first path detection method according to an embodiment of the present disclosure.

FIG. 9 is a diagram illustrating a method of finding an intersection point using a first path according to an embodiment of the present disclosure.

FIG. 10 is a flowchart illustrating a process of recognizing a pointing location using radar according to an embodiment of the present disclosure.

MODE FOR DISCLOSURE

While the disclosure is susceptible to various modifications and alternative forms, specific embodiments thereof are shown by way of example in the drawings and will herein be described in detail. It should be understood, however, that the disclosure is not intended to be limited to the particular embodiments, but includes all modifications, equivalents, and alternatives falling within the spirit and scope of the disclosure. Like reference numerals are used for like elements in describing each drawing.

Hereinafter, embodiments according to the present disclosure will be described in detail with reference to the accompanying drawings.

FIG. 1 is a diagram illustrating a configuration of a system for recognizing a pointing location using radar according to an embodiment of the present disclosure.

A system for recognizing a pointing location using radar according to an embodiment of the present disclosure may include a radar 10, a screen 20, and a device for recognizing a pointing location (hereinafter, referred to "pointing location recognition device") 100.

According to an embodiment of the present disclosure, the radar 10 may use impulse-radio ultra wide band (IR-UWB) radar. Of course, the radar of the present disclosure is not limited to the IR-UWB, and various radars may be used according to embodiments.

As shown in FIG. 1, a plurality of IR-UWB radars may be arranged around the screen 20 as shown in FIG. 1, to detect movement of a user located in front of the screen 20 and provide the detected signal to the pointing location recognizing device 100.

Meanwhile, the screen 20 may include a display monitor, or a wall surface or a roll screen on which an image is projected through a video projector.

On the other hand, the pointing location recognition device 100 first detects a hand area of a user in a space in front of the screen 20 using signals received by a plurality of radars 10 arranged around the screen 20 and recognize the position of finger (or the instruction means that the user holds in his/her hand) from the detected hand area, thereby displaying the pointing location on the screen 20.

Here, the "pointing location" is a point at which the user's finger (fingertip) is located in the space in front of the screen 20, and the position projected at the point becomes a pointing location displayed on the screen 20 which is a plane.

That is, according to the present disclosure, the pointing location is a position at which the user's fingertip is projected on the screen 20, not a direction indicated by the user's fingertip.

Hereinafter, the components of the pointing location recognition device 100 will be described in detail with reference to FIG. 2.

FIG. 2 is a block diagram illustrating a configuration of a pointing location recognition device according to an embodiment of the present disclosure; and FIG. 3 is a diagram illustrating a 3D space grid map according to an embodiment of the present disclosure.

The pointing location recognition device 100 according to an embodiment of the present disclosure includes a weight value space generation unit 110, a hand area detection unit 120, an effective radar selection unit 130, a finger position determination unit 140, a pointing location display unit 150, a control unit 160, and a storage unit 170.

Explaining each component, the weight value space generation unit 110 may generate the weight value space by dividing the space in front of the screen 20 into a plurality of unit spaces, in order to recognize the user's hand area located in the space in front of the screen 20.

That is, the weight value space has a plurality of unit spaces, and the shape thereof may be in a form of a "3D space grid map" as shown in FIG. 3.

Here, distance information for the plurality of radars 10 is already present in each unit space of the weight value space.

The weight value space may be created within a region corresponding to the area of the screen 20 within a predetermined distance in the forward direction (z-axis) from the screen 20. This means that the range of the space in which the user's hand is recognized may be limited to the weight value space.

In addition, the weight value space generation unit 110 assigns a weight to the unit space of the weight value space corresponding to the distance of the reception signal for each radar 10, from which the clutter is removed, in proportion to intensity of the signal for each distance.

Hereinafter, the weight value space will be described in detail with reference to FIG. 4.

FIG. 4 is a diagram illustrating a weight value space according to an embodiment of the present disclosure. FIG. 4 shows a result obtained by assigning the weight value space generation unit 110 to a unit space corresponding to each distance detected in reception signal for each radar 10, from which the clutter is removed, in proportion to intensity of the signal, the result being shown with hatching of different shades according to the assigned weighted values.

Herein, the weight value space generation unit 110 may assign the weight only to a unit space in which the intensity of the signal is equal to or greater than a predetermined threshold value.

The weight value space generation unit 110 assigns the same weight to a unit space having a similar distance to the distance from each radar 10 to the unit space to which the weight is assigned, and herein, a predetermined range is defined to be determined as the similar distance.

As a result, the unit spaces to which the same weight is assigned for each distance create a ring shape having distances to the unit spaces to which the weight values are assigned centered on each radar 10, as a radius, as shown in FIG. 4.

Meanwhile, the hand area detection unit 120 sums the weight values assigned to the respective unit spaces of the weight value space, and detects the unit spaces having the shortest distance from the screen 20 as a hand area as the summed weight value excesses a predetermined threshold.

The hand area detection will be described in detail with reference to FIG. 5.

FIG. 5 is a diagram illustrating a hand area detection method according to an embodiment of the present disclosure, in which FIG. 5(a) shows a weight value space for one radar, and FIG. 5(b) shows a weight value space for a plurality of radars 10.

The weight value space for all the radars 10 in FIG. 5(b) is a result obtained by summing the weight values assigned for each unit space.

Specifically, when each radar 10 senses the user's hand, shoulder, head, etc., a signal portion sensing each body part of the user is present in the signal received by each radar 10, and the weight value is assigned to the unit space of the weight value space corresponding to the distance of the signal portion, in proportion to the intensity of the reception signal.

When such method is performed for all the radars 10 so that the weight values of the unit space are summed, the weight values are accumulated in the unit spaces of the weight value space where each body part of the user is located, and accordingly the weight values in the corresponding unit spaces will be high compared to those of the other unit spaces.

As a result, a group of unit spaces may be present in which the summed (accumulated) weight value exceeds a predetermined threshold value, and each unit space represents each body part of the user, such as a hand area, a head area, and a shoulder area.

Here, assuming that the body part of the user located closest to the screen 20 is a user's hand, as shown in FIG. 5(b), as the summed (accumulated) weight values exceeds a predetermined threshold value, unit spaces having the shortest distance from the screen 20 may be detected as the hand area.

Here, assuming that the user's hand is located closest to the screen 20 is because the user generally stands in front of the screen 20, stretches his/her arm, and then points to a specific point on the screen with his/her finger, so that the finger rather than other body part of the user is positioned closest to the screen 20.

For reference, although the weight value space is shown as 2D in order to facilitate understanding in FIG. 5, the actual weight value space is formed in the form of a 3D space grid map in front of the screen 20 as shown in FIG. 3.

In addition, the hand area detection unit 120 may detect the hand area only at a predetermined sensing region.

FIG. 6 illustrates a sensing region according to an embodiment of the present disclosure, in which the hand area detection unit 120 may detect the hand area only in a region corresponding to the area (hereinafter, referred to as a "sensing region") of the screen 20 within a predetermined distance (e.g., 20 cm) in the front direction (z axis) from the screen 20.

On the other hand, the effective radar selection unit 130 detects a signal for a hand area from a signal received for each of a plurality of radars 10 by using the position of the detected hand area, and a radar having a shortest distance to the detected hand area may be selected as an effective radar.

The selection of the effective radar will be described in detail with reference to FIG. 7.

FIG. 7 illustrates an effective radar selection method according to an embodiment of the present disclosure, in which the effective radar selection unit 130 may inversely detect the signal portion for the hand area from the reception signal of each radar 10, by using the position of the hand area detected by the hand area detection unit 120.

Specifically, since the position of the hand area (distance from each radar) is known, the signal portion corresponding to the distance to the hand area in the reception signal of each effective radar becomes the signal portion for the hand area.

Thus, the effective radar selection unit 130 may select the radar having the shortest distance to the hand area in the reception signal of each radar 10, as an effective radar.

Here, "the shortest distance to the hand area in the reception signal" means that there is no separate obstacle between the corresponding radar and the hand area, and this coincides with the assumption that the user's body part that is located closest to the screen 20 is the user's hand. That is, the signal first detected from the reception signal becomes a signal that detects the hand area.

On the other hand, the finger position determination unit 140 detects a first point (hereinafter referred to as "first path") exceeding a predetermined threshold value in the reception signal for each effective radar selected by the effective radar selection unit 130, and determines an intersection point using the distance to each first path detected as the position of the user's finger.

Referring to FIG. 8 and FIG. 9, a method of finding the first path and an intersection point using the first paths will be described in detail.

FIG. 8 is a diagram illustrating a first path detection method according to an embodiment of the present disclosure.

The finger position determination unit 140 may set a threshold value for each effective radar using a constant false alarm rate (CFAR) algorithm, and set a point first exceeding a threshold value set for each radar in the reception signal of each effective radar, as the first path.

Here, the first path means the end of the finger that each effective radar detects in the user's hand area.

For reference, the CFAR algorithm creates a threshold value by adding sizes of several samples in the left and right on the basis of a test sample to be observed of all the samples and multiplying the same by a constant. Here, a false alarm rate is determined according to the multiplied constant, and it is determined that the sample exceeding the threshold value is detected.

Such CFAR algorithm has an advantage of having an adaptive threshold value for each signal because it creates the threshold value using neighboring samples of the test sample to be observed.

Upon applying the same to the present disclosure, in the reception signal of each effective radar from which the clutter is removed, the noise is smaller in size compared to the first path, which is the target signal.

Therefore, since the threshold value is made using the noise portion or the target signal, when observing the sample of the noise portion, there is a low likelihood that the size thereof exceeds the threshold value. Since the sample of the target signal portion is large in size compared to the noise, the size thereof exceeds the threshold value.

For reference, when the neighboring samples of the test sample are all target signals, the threshold value is so large that the sample may not be detected. However, since the nearest target signal always has noise samples in the front thereof, it is irrelevant with the case of setting the first path in the present disclosure.

The finger position determination unit 140 finds the first path for each effective radar and obtains an intersection point using the distance to the first path point of each effective radar, to determine the position of the fingertip located in the front of the screen 20 (hereinafter referred to as "the finger position").

This is shown in FIG. 9. FIG. 9 is a diagram illustrating a method of finding an intersection point using a first path according to an embodiment of the present disclosure, in which an intersection point using a distance to a first path of each radar is displayed.

Herein, in order to obtain an intersection point using the distance to the first path point of each radar, the finger position determination unit 140 may use the spherical equation with respect to three dimensional coordinates of the finger position, and a matrix for x and y coordinates on the screen 20 in the spherical equation and a least square solution for the matrix.

In the embodiment shown in FIG. 9, when there are three effective radars, the positions of the respective effective radars are $p_{xi}$, $p_{yi}$, $p_{zi}$ (where $p_{zi}=0$), the distance values of the first paths found by the respective effective radars are $r_1$, $r_2$, and $r_3$, and the finger positions are x, y, and z, each spherical equation is shown in the following Equation 1.

$$(x-p_{x1})^2+(y-p_{y1})^2+z^2=r_1^2$$
$$(x-p_{x2})^2+(y-p_{y2})^2+z^2=r_2^2$$
$$(x-p_{x3})^2+(y-p_{y3})^2+z^2=r_3^2 \quad \text{[Equation 1]}$$

Equation 2 below is obtained by spreading out Equation 1.

$$x^2+y^2+z^2-2xp_{x1}+p_{x1}^2-2yp_{y1}+p_{y1}^2=r_1^2$$
$$x^2+y^2+z^2-2xp_{x2}+p_{x2}^2-2yp_{y2}+p_{y2}^2=r_2^2$$
$$x^2+y^2+z^2-2xp_{x3}+p_{x3}^2-2yp_{y3}+p_{y3}^2=r_3^2 \quad \text{[Equation 2]}$$

Expressing the Equation 2 by a matrix equation, it is shown in Equation 3 below.

$$\begin{bmatrix}(-2p_{x1}+2p_{x2}) & (-2p_{y1}+2p_{y2})\\(-2p_{x2}+2p_{x3}) & (-2p_{y2}+2p_{y3})\end{bmatrix}\begin{bmatrix}x\\y\end{bmatrix}= \begin{bmatrix}r_1^2-r_2^2-(p_{x1}^2-p_{x2}^2+p_{y1}^2-p_{y2}^2)\\r_2^2-r_3^2-(p_{x2}^2-p_{x3}^2+p_{y2}^2-p_{y3}^2)\end{bmatrix}$$

$$A\begin{bmatrix}x\\y\end{bmatrix}=B \quad \text{[Equation 3]}$$

Using a least square solution that determines parameters of the model so as to minimize a sum of the data and the error in order to determine the finger position x and y on the screen 20, the finger position x and y on the screen 20 may be expressed as Equation 4 below.

$$\begin{bmatrix}x\\y\end{bmatrix}=(A^TA)^{-1}A^TB \quad \text{[Equation 4]}$$

The finger position determination unit 140 may determine the finger position x and y on the screen 20 using the equations as described above.

For reference, the error due to the z-axis distance may be corrected through projection.

Meanwhile, the pointing location display unit 150 may display the pointing location at a point on the screen 20 corresponding to the finger position determined by the finger position determination unit 140.

When the screen 20 is a display monitor, the pointing location display unit 150 may display the pointing location at a corresponding point of the display monitor, and when the screen 20 is a wall surface or a roll screen on which image is ejected via a projector, the pointing location display unit 150 may display the pointing location at a corresponding point on the screen 20.

For reference, although not shown in FIG. 2, an operation command sensing unit (not shown) for sensing finger movements or hand movements of the user and an operation command execution unit (not shown) for executing commands according to sensed movements in a state where a pointing location is displayed are further included.

For example, when the point where the pointing location is displayed is a button for switching the screen from the current page to the next page, when the user's finger or hand moves at a point where the pointing location is displayed according to an operation of clicking, the operation command sensing unit (not shown) analyzes a signal for a user's finger movement to detect that the corresponding signal is a click operation, and the operation command execution unit (not shown) may execute an operation command corresponding thereto.

Meanwhile, the control unit 160 may perform control so that components of the pointing location recognition device 100, such as a weight value space generation unit 110, a hand area detection unit 120, an effective radar selection unit 130, the finger position determination unit 140, and the pointing location display unit 150 may perform the above-described operations and also control the storage unit 170, which will be described later.

Meanwhile, the storage unit 170 may store an algorithm by which the control unit 160 performs control so that the components of the pointing location recognition device 100 perform the above-described operations, and various data necessary or derived in the control process.

FIG. 10 is a flowchart illustrating a process of recognizing a pointing location using radar according to an embodiment of the present disclosure.

The process shown in FIG. 10 may be performed by the pointing location recognition device 100 shown in FIG. 1.

For reference, a weight value space is generated in advance, and distance information for a plurality of radars 10 is already present in each unit space of the weight value space.

First, the pointing location recognition device 100 removes a fixed clutter from signals received for each of the plurality of radars 10 (S1001).

After step S1001, the pointing location recognition device 100 assigns a weight value to a unit space corresponding to each distance detected in a reception signal for each radar 10, in proportion to intensity of the reception signal (S1002).

Here, the weight value of the unit space in the weight value space may be updated when receiving the signal for each radar 10.

After step S1002, the pointing location recognition device 100 sums the weight values assigned for the respective unit spaces of the weight value space and detects the unit spaces having the shortest distance from the screen 20 as a hand area, as the summed weights exceed a predetermined threshold value (S1003).

Here, the pointing location recognition device 100 may detect the hand area only in a region corresponding to the area of the screen 20 within a predetermined distance in the forward direction from the screen 20.

After step S1003, the pointing location recognition device 100 detects a signal for the hand area in the signal received for each of a plurality of radars using the position of the detected hand area, and selects the radar having the shortest distance to the detected hand area as an effective radar of a plurality of radars (S1004).

Here, "the shortest distance to the hand area in the reception signal" means that there is no obstacle between the corresponding radar and the hand area, and the signal first detected in the reception signal is a hand area signal.

After step S1004, the pointing location recognition device 100 detects a first path exceeding a predetermined threshold value from the reception signal for each selected effective radar and determines an intersection point using the distance to each detected first path as the position of user's finger (S1005).

Here, the pointing location recognition device 100 may set a threshold value for each effective radar using a constant false alarm rate (CFAR) algorithm.

In order to obtain the intersection point using the distance to the first path of each radar, it is possible to use a spherical equation for the three dimensional coordinates of the finger position, and a matrix for the x and y coordinates on the screen 20 in the spherical equation and a least square solution for the matrix.

After S1005, the pointing location recognition device 100 displays the pointing location at a point on the screen 20 corresponding to the determined finger position (S1006).

After S1006, when the operation of the user's finger or hand is detected at the pointing location, the pointing location recognition device 100 executes a command corresponding to the detected operation (S1007).

The above-described technical features may be implemented in the form of program instructions that may be executed through various computer means and recorded in a computer-readable medium.

The computer-readable medium may include program instructions, data files, data structures, and the like, alone or in combination.

Program instructions recorded on the medium may be specially designed and configured for the embodiments, or may be known and thus available to those skilled in the art of computer software.

Examples of the computer-readable recording medium include magnetic media such as a hard disk, a floppy disk and a magnetic tape, optical media such as a CD-ROM and a DVD, a magneto-optical media such as floptical disk, and a hardware device specifically configured to store and execute program instructions such as ROM, RAM, flash memory, and the like.

Examples of program instructions include machine language code, such as those produced by a compiler, as well as high-level language code that can be executed by a computer using an interpreter or the like.

A hardware device may be configured to operate as one or more software modules to perform operations of embodiments, and vice versa.

While the present disclosure has been particularly shown and described with reference to exemplary embodiments thereof, it is to be understood that the disclosure is not limited to the disclosed embodiments. On the contrary, various modifications and changes may be made thereto without departing from the scope of the present disclosure.

Accordingly, it is to be understood that the subject matter of the disclosure is not limited to the disclosed embodiments, and that all equivalents of the claims, as well as the appended claims are intended to fall within the scope of the present disclosure.

The invention claimed is:

1. A system for recognizing a user's pointing location comprising:
 a plurality of radars arranged around a screen; and
 a pointing location recognition device configured to:
 generate a weight value space having a plurality of unit spaces in a space in front of the screen, and assign a weight value to the unit space corresponding to each of distances detected in a reception signal for each of the plurality of radars, from which clutter is removed, in proportion to intensity of the reception signal;
 sum the weight values assigned for the respective unit spaces of the weight value space, and detect, as a hand area, unit spaces having a shortest distance from the screen as the summed weight values exceed a predetermined threshold value;
 select a radar having a shortest distance to the detected hand area among the plurality of radars as an effective radar; and
 detect a first path exceeding a predetermined threshold value in the reception signal for each of the selected effective radars, and determine, as a position of a user's finger, an intersection point using a distance to each of the detected first paths.

2. The system of claim 1, wherein distance information for the plurality of radars is already present in each of the unit spaces of the weight value space;
 the pointing location recognition device assigns a same weight value to a unit space having a distance similar to a distance from each radar to the unit space to which the weight value is assigned, the similar distance having a predetermined range; and
 the unit spaces to which a same weight is assigned for each of the distances create a form of a ring centered on each radar.

3. The system of claim 1, wherein the pointing location recognition device detects the hand area only in a region corresponding to an area of the screen within a predetermined distance in a forward direction from the screen.

4. The system of claim 1, wherein the pointing location recognition device determines the finger position on the screen on the basis of a spherical equation for three dimensional coordinates of the finger position, and a matrix for x and y coordinates on the screen in the spherical equation and a least square solution for the matrix.

5. The system of claim 1, wherein the pointing location recognition device sets the threshold value for each of the effective radars using a constant false alarm rate (CFAR) algorithm, and sets a point first exceeding the set threshold value in the reception signal of each effective radar, as the first path.

6. The system of claim 1, further comprising:
a pointing location display unit displaying the pointing location at a point on the screen corresponding to the determined finger position,
wherein the pointing location display unit corrects x and y coordinates through projection of a z coordinate of three dimensional coordinates of the finger position.

7. A method of recognizing a user's pointing location by using a plurality of radars arranged around a screen, the method comprising:
(a) generating a weight value space having a plurality of unit spaces in a space in front of the screen, and assigning a weight value to the unit space corresponding to each of distances detected in a reception signal for each of the plurality of radars, from which clutter is removed, in proportion to intensity of the reception signal;
(b) summing the weight values assigned for the respective unit spaces of the weight value space, and detecting, as a hand area, unit spaces having a shortest distance from the screen as the summed weight values exceed a predetermined threshold value;
(c) selecting, as an effective radar, a radar having a shortest distance to the detected hand area among the plurality of radars; and
(d) detecting a first path exceeding a predetermined threshold value in the reception signal for each of the selected effective radars, and determining, as a position of a user's finger, an intersection point using a distance to each of the detected first paths.

8. The method of claim 7, wherein distance information for the plurality of radars is already present in each of the unit spaces of the weight value space;
the step (a) assigns a same weight value to a unit space having a distance similar to a distance from each radar to the unit space to which the weight value is assigned, the similar distance having a predetermined range; and
the unit spaces to which a same weight is assigned for each of the distances create a form of a ring centered on each radar.

9. The method of claim 7, wherein the step (b) detects the hand area only in a region corresponding to an area of the screen within a predetermined distance in a forward direction from the screen.

10. The method of claim 7, wherein the step (d) determines the finger position on the screen on the basis of a spherical equation for three dimensional coordinates of the finger position, and a matrix for x and y coordinates on the screen in the spherical equation and a least square solution for the matrix.

11. The method of claim 7, wherein the step (d) sets the threshold value for each of the effective radars using a constant false alarm rate (CFAR) algorithm, and sets a point first exceeding the set threshold value in the reception signal of each effective radar, as the first path.

12. The method of claim 10, further comprising:
(e) displaying the pointing location at a point on the screen corresponding to the determined finger position,
wherein the step (e) corrects x and y coordinates through projection of a z coordinate of three dimensional coordinates of the finger position.

13. The method of claim 12, further comprising:
(f) recognizing a command operation of the user for a point where the pointing display is output; and
(g) performing the recognized command operation.

14. A non-transitory computer-readable recording medium storing a program including a series of instructions for performing the method according to any one of claims 7 to 13.

* * * * *